(12) United States Patent
Schwaiger (10) Patent No.: US 11,904,934 B2
(45) Date of Patent: Feb. 20, 2024

(54) RUNNING GEAR

(71) Applicant: AGILOX SYSTEMS GMBH, Neukirchen bei Lambach (AT)

(72) Inventor: Meinhard Schwaiger, Linz (AT)

(73) Assignee: AGILOX SYSTEMS GMBH, Neukirchen bei Lambach (AT)

( * ) Notice: Subject to any disclaimer, the term of this patent is extended or adjusted under 35 U.S.C. 154(b) by 1208 days.

(21) Appl. No.: 16/481,645

(22) PCT Filed: Jan. 25, 2018

(86) PCT No.: PCT/AT2018/060024
§ 371 (c)(1),
(2) Date: Jul. 29, 2019

(87) PCT Pub. No.: WO2018/136987
PCT Pub. Date: Aug. 2, 2018

(65) Prior Publication Data
US 2023/0166792 A1 Jun. 1, 2023

(30) Foreign Application Priority Data
Jan. 28, 2017 (AT) .................................. 60009/2017

(51) Int. Cl.
*B62D 11/04* (2006.01)
*B62D 7/04* (2006.01)

(52) U.S. Cl.
CPC ................ *B62D 11/04* (2013.01); *B62D 7/04* (2013.01)

(58) Field of Classification Search
CPC .......... B62D 11/02; B62D 11/04; B62D 7/02; B62D 7/04
See application file for complete search history.

(56) References Cited

U.S. PATENT DOCUMENTS

| | | | |
|---|---|---|---|
| 4,529,052 A * | 7/1985 | Imai | G05D 1/0272 180/23 |
| 4,589,510 A | 5/1986 | Düerwald et al. | |
| 4,816,998 A | 3/1989 | Ahlbom | |
| 5,623,818 A | 4/1997 | Ledbetter | |
| 6,491,127 B1 * | 12/2002 | Holmberg | B62D 7/026 301/6.5 |
| 6,540,039 B1 * | 4/2003 | Yu | B60B 33/0002 180/264 |
| 7,789,175 B2 * | 9/2010 | Tobey | B60B 27/0047 180/6.48 |

(Continued)

FOREIGN PATENT DOCUMENTS

| | | |
|---|---|---|
| AT | 409369 B | 7/2002 |
| DE | 3328241 A1 | 2/1985 |

(Continued)

*Primary Examiner* — Tony H Winner
(74) *Attorney, Agent, or Firm* — Dykema Gossett PLLC (57) ABSTRACT

Aspects of the invention are directed to running gear for transport devices comprising a guide ring, a wheel carrier configured and arranged to be pivoted within the guide ring about a vertical main axis of rotation and two wheels configured and arranged to be rotated about a common axis of rotation, and an inner ring pivotably mounted in the guide ring via a rotary bearing about the main axis of rotation, and the wheel carrier is pivotably mounted via at least one pivot bearing about a pivot axis perpendicular to the main axis of rotation.

21 Claims, 8 Drawing Sheets

(56) References Cited

U.S. PATENT DOCUMENTS

2005/0236208 A1* 10/2005 Runkles ............... B60K 17/303
           180/254
2008/0269960 A1    10/2008 Kostmann
2011/0168474 A1*   7/2011 Checketts ............. B62D 7/026
           74/425

FOREIGN PATENT DOCUMENTS

| DE | 4234174 A1 | 4/1994 | |
| DE | 102007046868 A1 | 4/2009 | |
| DE | 102013017062 A1 | 4/2015 | |
| DE | 102013019726 A1 * | 5/2015 | ............ B62D 11/20 |
| DE | 102013019726 A1 | 5/2015 | |
| DE | 202014000755 U1 | 5/2015 | |
| EP | 2062837 A1 | 5/2009 | |
| EP | 2336075 A1 | 6/2011 | |
| GB | 820228 | 10/1959 | |
| GB | 1491923 | 11/1977 | |
| WO | 2012096570 A1 | 7/2012 | |

* cited by examiner

RUNNING GEAR

CROSS-REFERENCE TO RELATED APPLICATIONS

This application is a national stage filing based upon International PCT Application No. PCT/AT2018/060024, filed 25 Jan. 2018, which claims the benefit of priority to Austria application No. A 60009/2017, filed 28 Jan. 2017.

BACKGROUND

The invention relates to a running gear for transport devices having a guide ring and a wheel carrier which can be pivoted in the guide ring about an essentially vertical main axis of rotation and on which two wheels rotatable about a common axis of rotation are arranged.

In particular, the present invention relates to a drive system for highly agile and precisely controllable transport devices for the automated transport, picking up and delivery of goods, transport containers or pallets, as well as for highly agile platforms equipped with automated handling devices (e.g. gripping, supporting, holding and clamping devices), automated work equipment (e.g. for riveting, screwing, welding, painting, grinding or polishing work), complex robot systems (e.g. jointed-arm robots) or other devices for performing tasks in particularly endangered or inaccessible areas (e.g. remote-controlled detection, salvage or deactivation of potentially dangerous objects) with steerable wheel units integrated in the running gear.

From the GB 820 228 A a stacking vehicle with a U-shaped running gear is known, wherein each leg of the running gear has a wheel unit with steerable wheels. The wheel units can be operated centrally via a steering device.

AT 409 369 B discloses a device for transporting goods by means of a gantry hoist equipped with all-wheel steering, wherein the wheels that can be moved in guides can be pivoted by 90°.

DE 33 24 862 A1 describes a steering mechanism for an all-wheel steering vehicle with a lever linkage connecting the wheels.

Autonomous driverless transport systems are known from publications EP 2 062 837 A1, WO 2005/118436 A1, DE 33 28 241 A1, DE 24 35 494 A1, DE 10 2007 046 868 A1, DE 10 2013 017 062, EP 2 336 075 B1.

U.S. Pat. No. 5,623,818 A discloses a four-wheeled vehicle whose wheel units are driven individually, e.g. by hydraulic motors. Each two wheel units are mechanically coupled, so that a rotation of the vehicle on stand is possible.

GB 2 042 217 A discloses a self-propelled transport vehicle with a steerable drive wheel and two support wheels, the rotation of which is detected by sensors.

WO 2012/096570 discloses a mobile vehicle or a transfer device with drive wheels whose axes of rotation are aligned parallel in one plane essentially parallel to the ground and which are each aligned about a second axis perpendicularly to the plane in the desired direction of travel by means of a second independent drive unit.

A driverless industrial truck with light or ultrasonic sensors is known from DE 42 34 174 A1, wherein a driving correction is carried out if the sensors indicate a defective position.

DE 10 2007 046 868 and DE 10 2013 017 062 show a drive system for an automated transport system for pallets consisting of two wheel units each with two independently driven wheels, so that these can determine the direction of travel of the drive unit by controlling the circumferential speed and the transport system can perform any number of cornering movements; the drive unit is mounted so that it can rotate vertically in the center with drive axles that are rigid in relation to the road surface plane, so that this cannot compensate for uneven ground and uncontrolled lateral movements can occur at high speed.

In addition, EP 2 336 075 B1 discloses a drive system for a driverless transport system, which is designed with steerable wheel units, each consisting of two individually driven wheels, rotatably mounted about a vertical axis and whose direction and speed is influenced by a speed control of the drive wheels.

In particular when automatically picking up goods to be transported or pallets, when docking onto fixed transfer stations or when carrying out precise work using automated handling or working devices on the transport device, the problem arises that the transport device and the pallet or transfer station must be aligned exactly with one another, or the handling or working device must be aligned exactly at certain positions and the travel path also follows a precisely defined movement path without reversing. This requires a particularly precise drive and positioning system and presupposes that with such drive systems with steerable wheel units, both drive wheels of a wheel unit always have reliable ground contact. Previously known steerable wheel units with two independently driven wheels have a centrally arranged pivoting rotary bearing. This embodiment has the disadvantage that only small transverse forces can be absorbed and the transverse forces arising during cornering must be kept to a minimum. By reducing the speed in the curve or cornering, they can be completely replaced by straight sections in forward and backward motion, a 45° diagonal transverse motion and a rotary motion of the transport device only at a standstill. This disadvantage slows down the transport processes or prevents their use for certain applications that require an exact movement along defined path curves.

SUMMARY OF THE INVENTION

It is the object of the invention to define a drive system with steerable wheel units which permits exact positioning of the transport system and a uniformly high speed even during random cornering on uneven surfaces and can reliably absorb high transverse forces.

In accordance with the invention, this is achieved in such a way that an inner ring is pivotably mounted in the guide ring about the main axis of rotation via a rotary bearing and in that the wheel carrier is pivotably mounted about a pivot axis arranged essentially perpendicularly to the main axis of rotation via at least one pivot bearing.

Unless otherwise stated, the directions and locations given, such as perpendicular or horizontal, refer to running gears which are in their intended position of use on a level road surface, i.e. the wheels are arranged on the underside.

This ensures that the wheel units are supported against the transport device both in the vertical direction and in the horizontal direction in the direction of travel and transversely to the direction of travel, and that the steerable wheel unit can be pivoted perpendicularly to the respective direction of travel to compensate for uneven ground, so that both wheels of a wheel unit are always in contact with the ground even if the ground is uneven.

It is also advantageous if the two wheels can be driven independently of each other. Thus, a rotary movement can be induced by different control of the wheels, while a linear movement is possible with the same control.

It may be provided that two drive motors are provided in the wheel carrier, each of which is connected to one wheel preferably via a transmission. This makes it easy to follow different directions of movement.

Particularly if the rotary bearing is designed as a rolling bearing, a smooth-running rotary connection can be produced in a cost-effective manner.

In addition, it may be provided that the pivot axis is arranged both perpendicularly to the main axis of rotation and to the common axis of rotation of the wheels. This ensures optimum mobility in all directions.

It is advantageous if the wheels, which determine the direction of travel, are aligned via the rotary bearing, the main axis of rotation of which is essentially perpendicular to the road surface, and the level compensation angle is 10× up to +/−15°, preferably +/−5°. This allows the running gear to compensate for obstacles or unevenness on the traveled surface.

It is also advantageous if the pivot axis and the axis of rotation are preferably located in a common plane which is parallel to the road surface plane when in use. This is based on the assumption that the road surface is essentially level.

In a preferred embodiment, the guide ring has a cylindrical bore to accommodate the rotary bearing and the outer geometry has a random geometrical shape, e.g. cuboid. This ensures that the inner ring can move well in the guide ring, while the outer geometry of the guide ring can be adapted to adjacent parts such as coupling devices.

In order to be able to transport goods even better, it is advantageous if the transport device is used with several running gears of the type described, preferably with four running gears and, in the case of very large transport devices, for accommodating particularly bulky or heavy goods such as aircraft components (fuselage parts, wing parts), large machine components for large turbines, road or railway wagons or locomotives with more than four running gears. It is particularly preferably provided that the common axes of rotation of the running gears can be aligned relative to each other. This means that the directions of movement can be coordinated so that the direction of movement, speed of movement and the like of the transport device can be freely selected and optimized. The common axes of rotation can be aligned relative to each other and relative to the transport device by changing the speeds and directions of rotation of the wheels in a defined way, and almost unlimited maneuverability can be achieved, so that movement can be carried out straight ahead or in any path curve forwards, backwards or sideways and turning on the stand.

It is also advantageous if the travel directions of the running gears of the transport device are aligned parallel when driving straight ahead in one main direction of movement. This enables a linear movement.

It can also be advantageous if, for cornering in any direction and at any speed, the current travel directions of the running gears are aligned with a vanishing point derived from the trajectory of the desired path of movement at a distance from the center of motion of the transport device by means of the axes of rotation by controlling the rotational speeds of the wheels, and the curved path speed of the transport device is controlled by controlling the individual rotational speeds of the wheels.

It may also be useful if, in order to turn on the stand about the axis at the rotational speed, the running gears are aligned with the vanishing point at a distance from the center of rotation of the transport device by means of the axes of rotation by controlling the rotational speeds of the wheels and the rotational speed of the transport device is controlled by controlling the individual rotational speeds of the wheels.

Furthermore, it is preferably provided that laser scanners are provided for navigation and safe operation, preferably two laser scanners, the rotating laser beams of which overlap and sweep over circular portions of the surface, thus enabling a 360° panoramic view in the plane. These laser scanners are preferably located at two opposite corners of the transport device. The laser scanners can thus detect obstacles and other objects in the environment and the path of movement can be planned and optimized sensibly.

If the energy supply is electrical and at least one energy storage device for the energy supply is arranged in the transport device, wherein the charging process of the energy storage devices is contact-free or by means of contacts, the transport device can essentially move wirelessly and only needs to be charged at low energy levels.

In the case of particularly advantageous embodiments, it is provided that this is equipped with devices for the automated transport, reception and delivery of goods, transport containers or pallets. This extends the range of application of the transport device.

Furthermore, it may be provided that these are equipped with additional devices as automated handling devices, e.g. gripping, supporting, holding and clamping devices, or as automated working devices, e.g. riveting, screwing, welding, painting, grinding or polishing devices, or as complex robot systems, e.g. jointed-arm robots or snake arms, or as camera systems or other equipment for performing tasks in particularly hazardous or inaccessible areas, such as remotely controlled detectors, devices for salvaging or defusing potentially dangerous objects, and the movement of the transport device is controlled by the wheels in coordination with the movement of the auxiliary equipment. This enables essentially automatic or semi-automatic loading and transport.

BRIEF DESCRIPTION OF THE DRAWINGS

The invention is explained in more detail below using the non-restrictive figures, wherein.

DETAILED DESCRIPTION

The drive system according to the invention consists of a guide ring 1, a wheel carrier 2 for the two separately driven drive wheels 3 and 3a, with the common axis of rotation 10, the drive motors 4 and 4a and the pivot bearing 5, which forms the pivot axis 6, the rotary bearing 7, which forms the main axis of rotation 9, and the inner ring 8.

The vertical forces are transferred from the guide ring 1 via the rotary bearing 7 to the rotary pivot ring, namely the inner ring 8, the pivot bearing 5 and further on to the wheel carrier 2 and to the drive wheels 3 and 3a, wherein the drive wheels can align themselves unhindered around the main axis of rotation 9 in any direction of travel and can align themselves unhindered around the pivot axis 6 to compensate for uneven ground. Horizontal forces resulting from the forward movement of the transport device 11 and the transverse forces during cornering are absorbed by the inner ring 8, the rotary bearing 7 and the guide ring 1.

Through defined individual control of the speeds of the drive wheels 3 and 3a, the individual drive units are aligned in relation to their main axis of rotation 9, so that a transport device 11 carried out with them can be maneuvered almost without restriction, i.e. forwards, backwards, sideways, in any path curve and rotating at the stand, in the plane.

For navigation and safe autonomous operation, laser scanners 14 and 14a are provided, which enable 360° panoramic view in the plane.

The power supply is preferably electrical, wherein state-of-the-art accumulators are used to store the electrical energy, which can also be recharged at the same time during load operation. The charging process is contact-free or by means of contacts.

Figure 1:
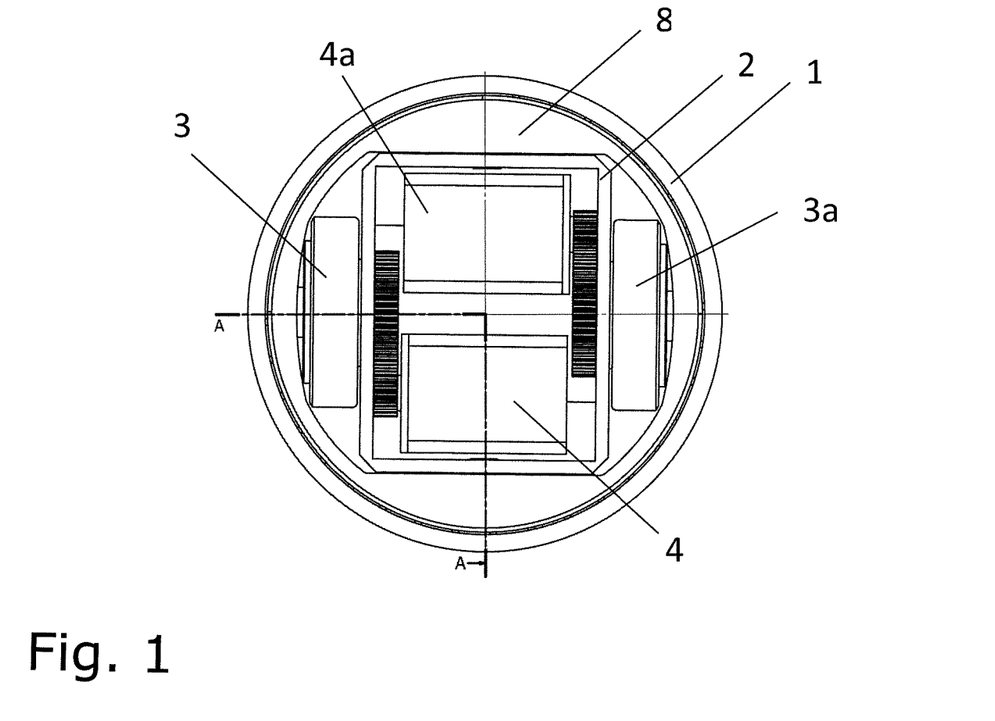
FIG. 1 shows a running gear (wheel unit) according to the invention in plan view.
Figure 2:
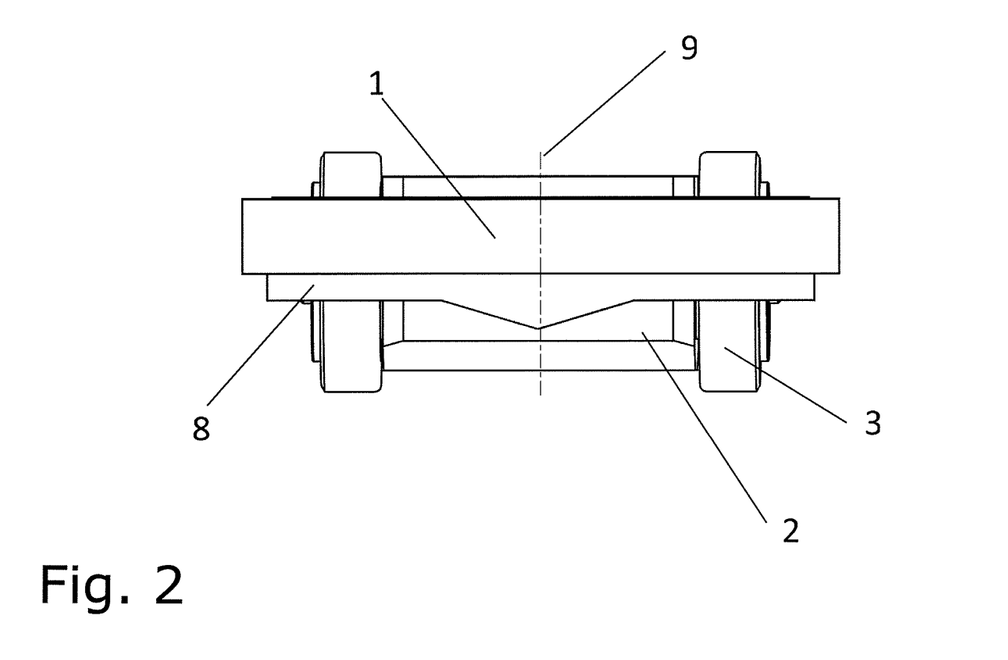
FIG. 2 shows the wheel unit in a view in the direction of travel.
Figure 3:
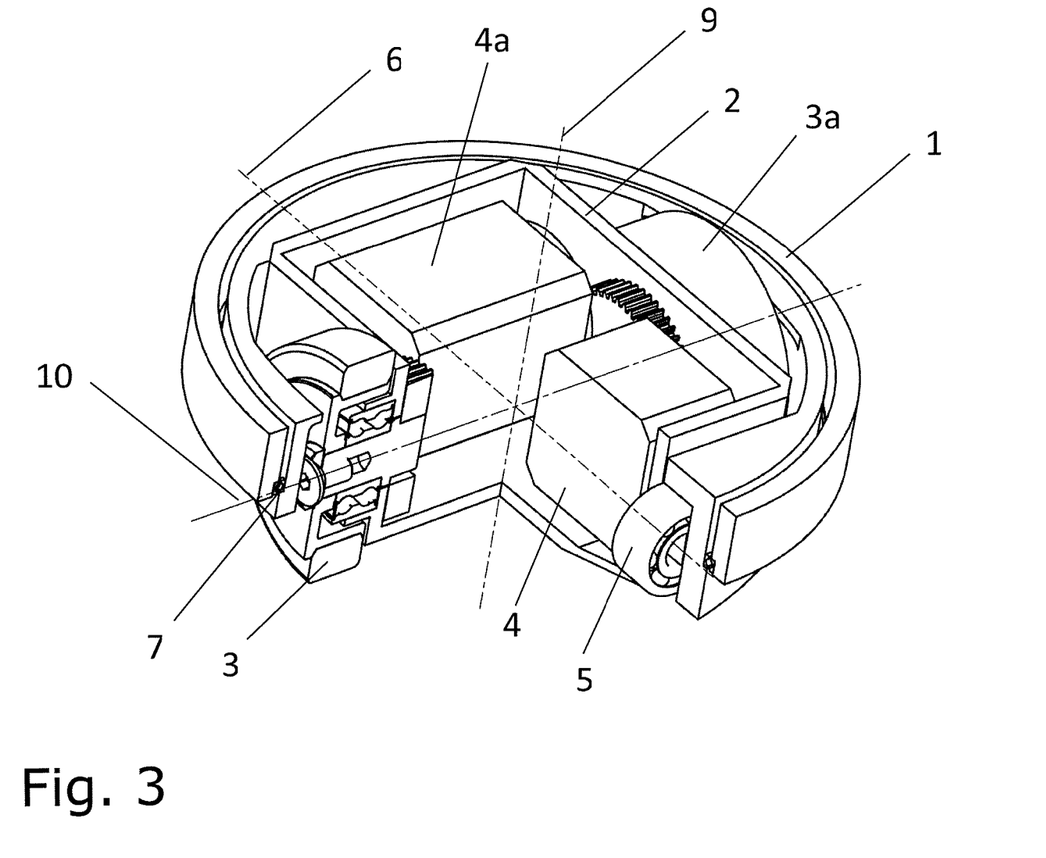
FIG. 3 shows the wheel unit in inclined view from above and in section along the section line A-A of FIG. 1.
Figure 4:
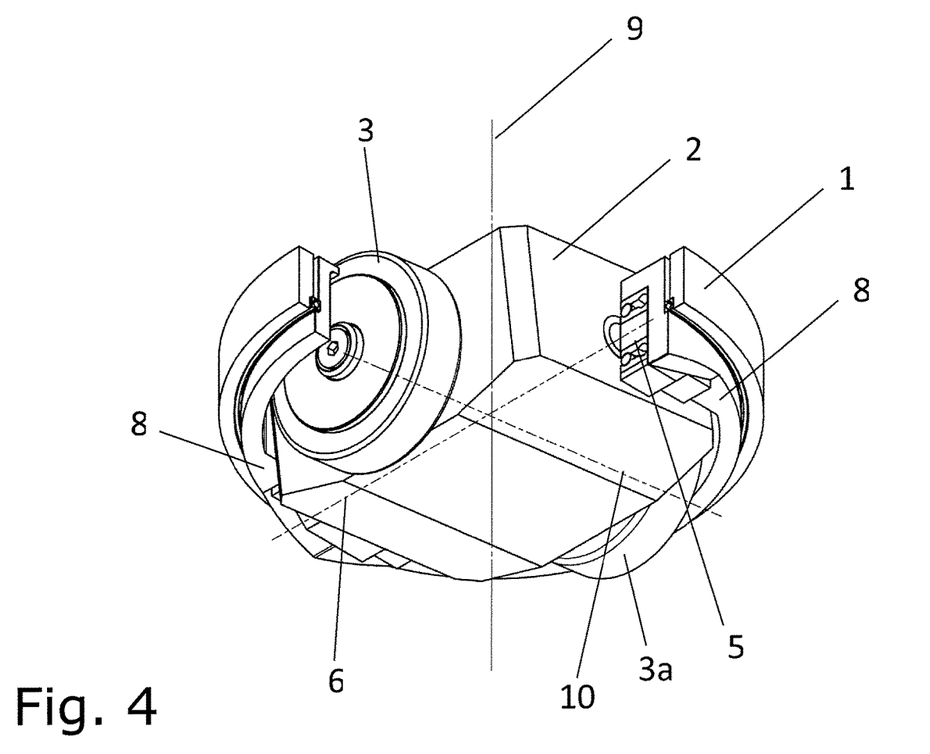
FIG. 4 shows the wheel unit in inclined view from below with cut open rotary and tilting bearing.
Figure 5:
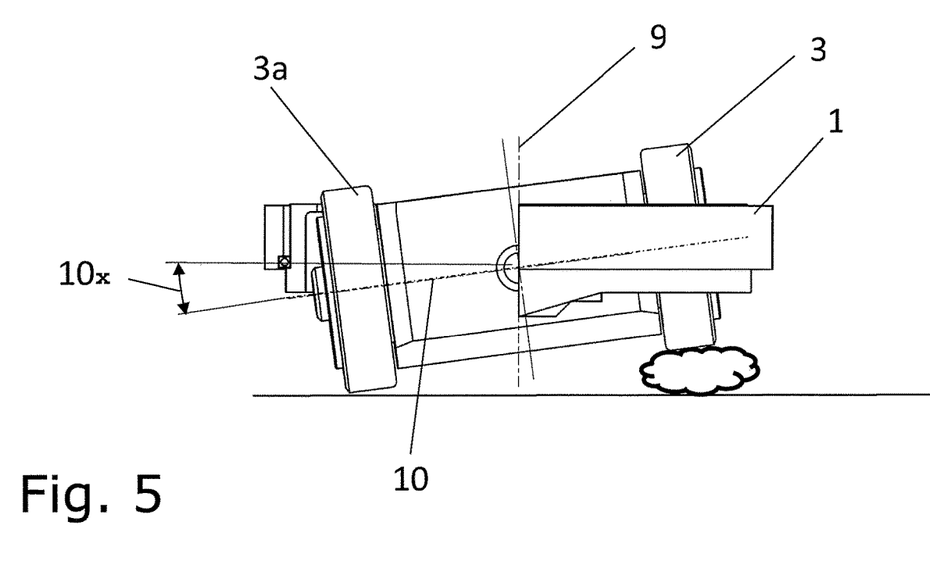
FIG. 5 shows the wheel unit in mounting position in driving direction with inclined position of the drive wheels due to unevenness of the ground with cut open rotary and tilting bearing.
Figure 6:
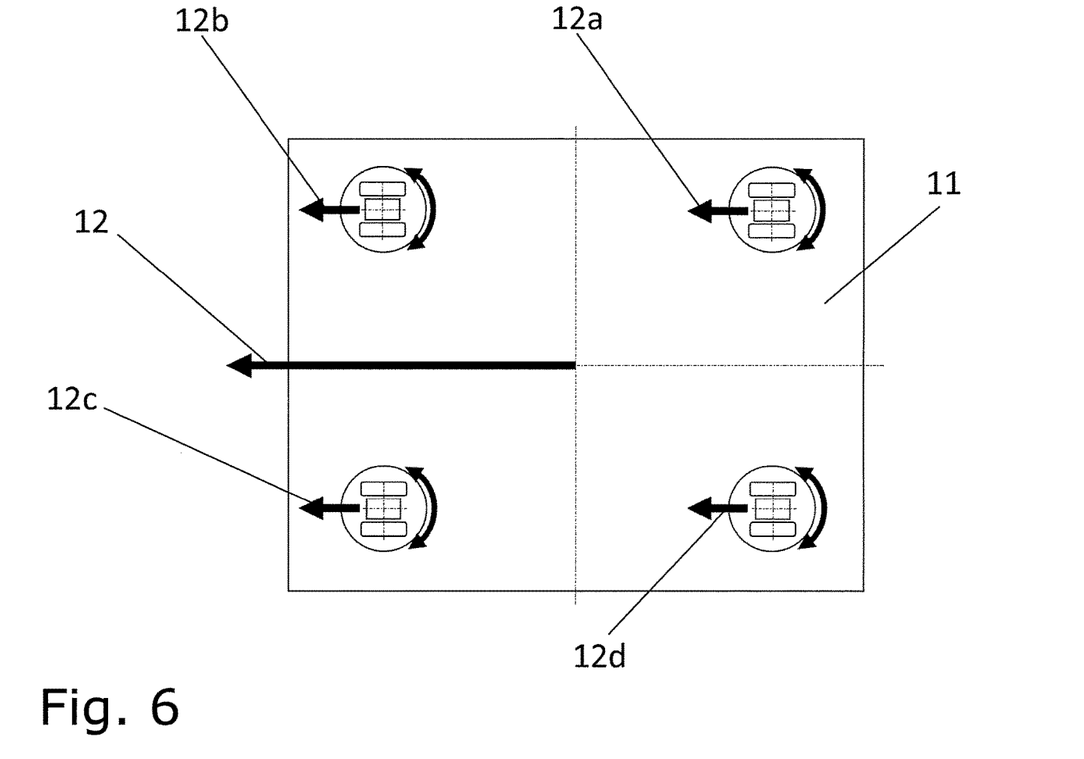
FIG. 6 shows a transport device in a schematic view with four drive systems aligned in parallel and travelling straight ahead.
Figure 7:
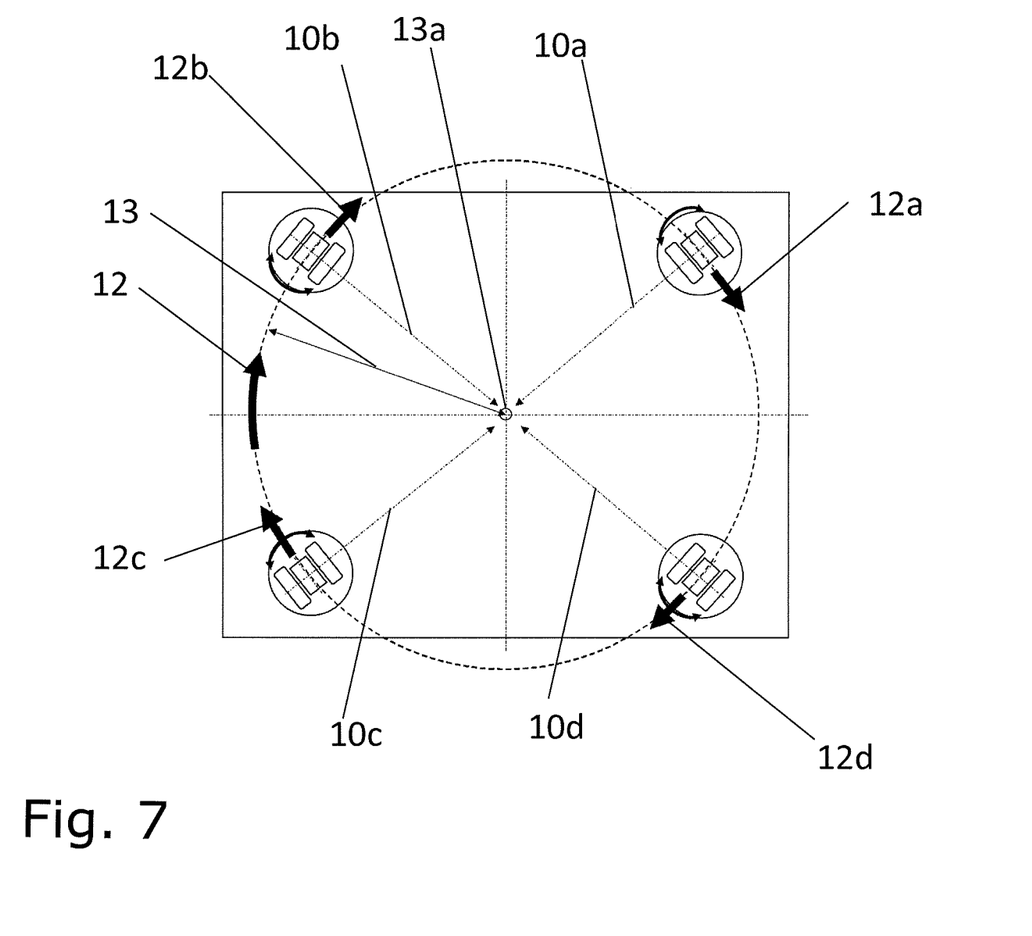
FIG. 7 shows the transport device with four drive systems aligned for rotation on the stand in a schematic view from below.
Figure 8:
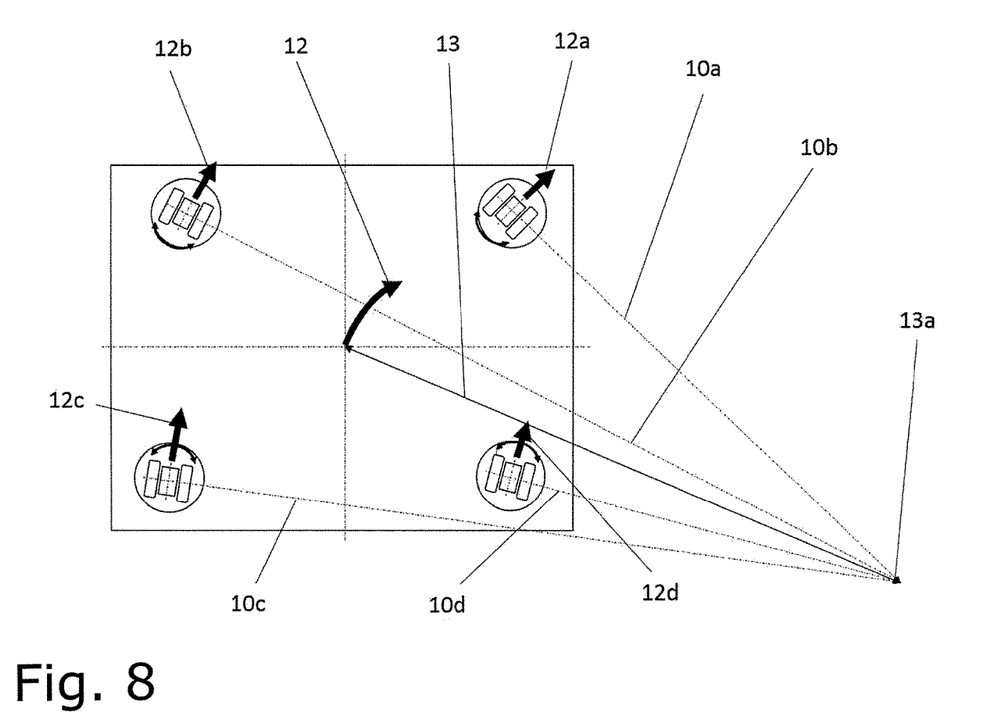
FIG. 8 shows the transport device with four drive systems aligned for cornering in a schematic view from below.

FIG. 6, FIG. 7 and FIG. 8 represent different movement patterns of a transport device 11 with four running gears arranged at the corners of the transport device 11. FIG. 6 shows an essentially linear movement in which all running gears have parallel axes of rotation 10a, 10b, 10c, 10d of their wheels 3, 3a. Thus all their driving directions 12a, 12b, 12c, 12d are parallel and point in the same direction. This results in a linear main direction of movement 12 for the transport device 11.

In the rotary movement shown in FIG. 7, all axes of rotation 10a, 10b, 10c, 10d meet in a vanishing point 13a, which thus represents the rotary axis. The vanishing point 13a is arranged essentially in the middle of the transport device 11, whereby the directions of travel 12a, 12b, 12c, 12d, which are tangential to a movement circle, lead to a circular main direction of movement 12. Thus the transport device 11 rotates around itself.

In FIG. 8, the vanishing point 13a is arranged outside the transport device 11, which is why the directions of travel 12a, 12b, 12c, 12d each have different directions. The running gears are aligned with the vanishing point 13a derived from the trajectory of the desired path of movement at a distance 13 from the center of motion of the transport device 11 by means of the rotational axes 10a to 10d by controlling the rotational speeds of the wheels 3, 3a and the curve path speed of the transport device 11 is controlled by controlling the individual rotational speeds of the wheels.

Figure 9:
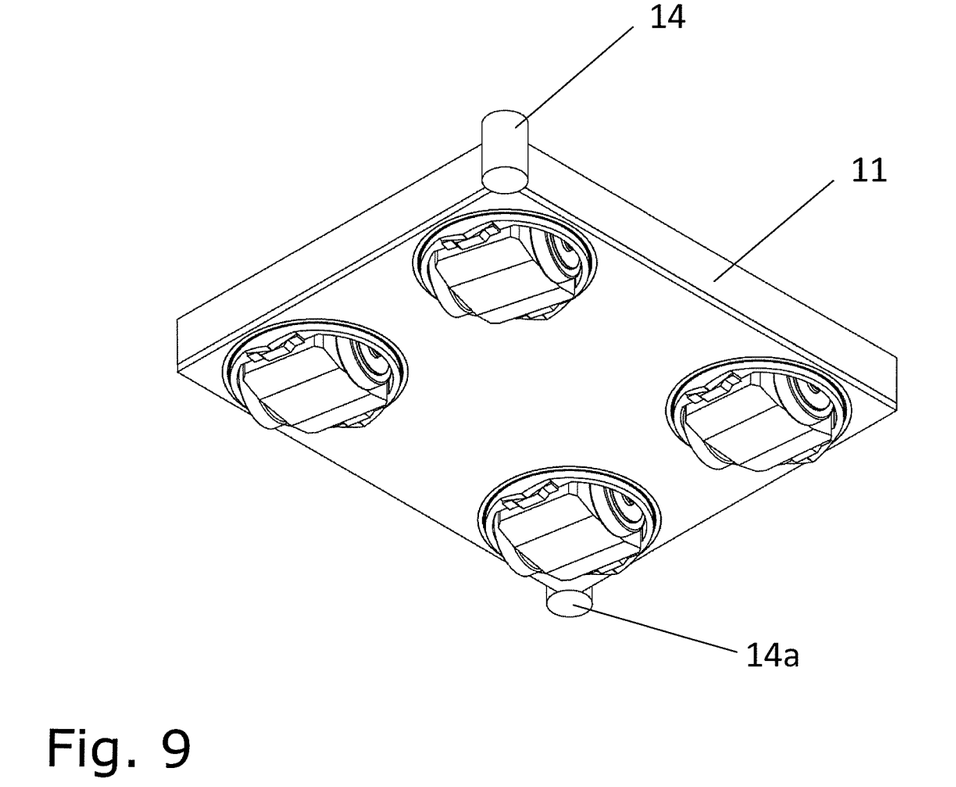
FIG. 9 shows the transport device with four drive units in inclined view from below with additional navigation/safety sensors.
Figure 10:
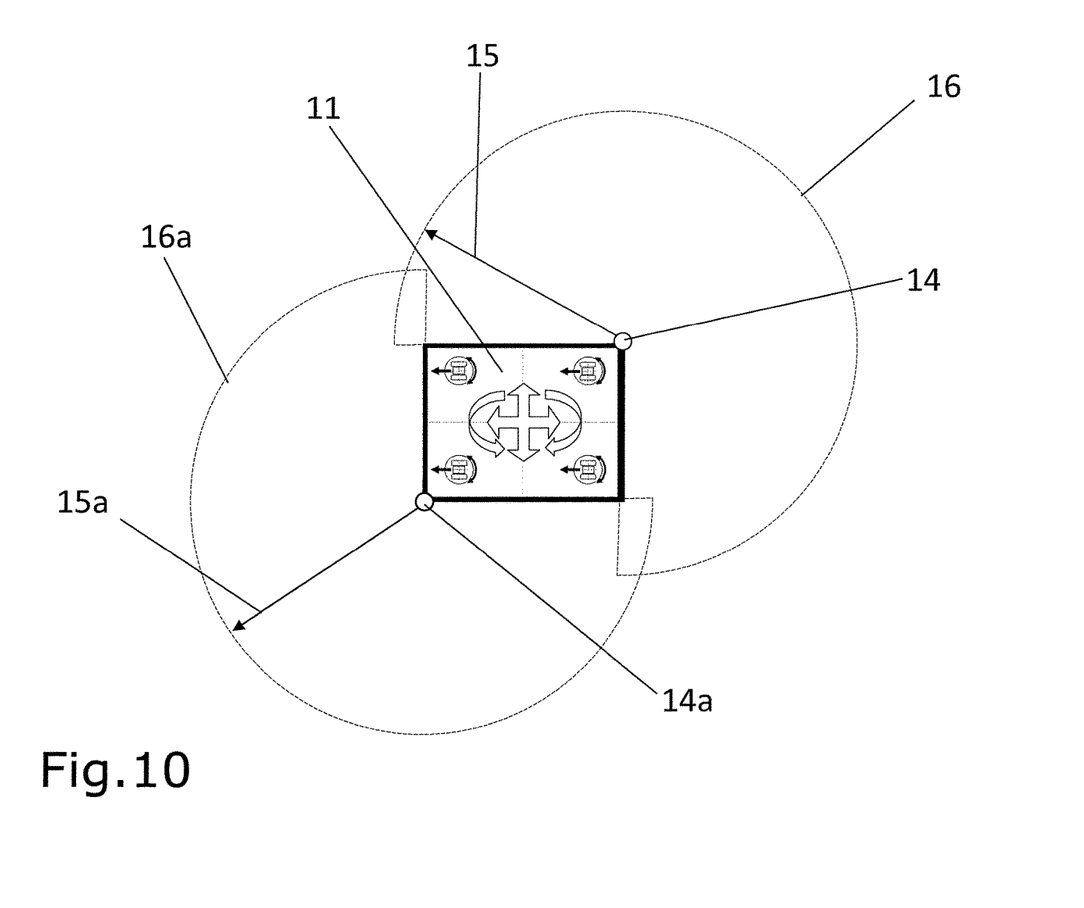
FIG. 10 shows the transport device with four drive units in view from below with additional navigation/safety sensors and their detection areas.

In FIG. 9 and FIG. 10, laser scanners 14, 14a are arranged at two opposite corners of the transport device 11, which can scan approx. one three-quarter circle each by scanning laser beams 15, 15a as surface portions 16, 16a of the environment. This arrangement allows the direct vicinity of the transport device 11 to be scanned on all sides. This is guaranteed by overlapping surfaces.

The invention claimed is:

1. A running gear for transport devices comprising:
    a guide ring;
    a wheel carrier configured and arranged to be pivoted within the guide ring about a vertical main axis of rotation;
    two wheels coupled to the wheel carrier and configured and arranged to be rotated about a common axis of rotation; and
    an inner ring pivotably mounted in the guide ring about the main axis of rotation via a rotary bearing, and the wheel carrier is pivotably mounted about a pivot axis arranged essentially perpendicular to the main axis of rotation via at least one pivot bearing, wherein the at least one pivot bearing is mounted on the inner ring.

2. The running gear according to claim 1, wherein the two wheels are configured and arranged to be driven independently of one another.

3. The running gear according to claim 2, further including two drive motors provided in the wheel carrier, each of the two drive motors are connected to one of the two wheels.

4. The running gear according to claim 3, wherein the two drive motors are connected to the wheels via a transmission.

5. The running gear according to claim 1, wherein the rotary bearing is a rolling bearing.

6. The running gear according to claim 1, wherein the pivot axis is arranged perpendicular to the main axis of rotation and to the common axis of rotation of the wheels.

7. The running gear according to claim 1, wherein an alignment of the wheels, which determines a direction of travel, takes place via the rotary bearing, the main axis of rotation of which is aligned perpendicular to a road surface plane, and a level compensation angle is +/−15°.

8. The running gear according to claim 7, wherein the main axis of rotation is aligned substantially perpendicularly to the plane of the road surface plane and the level compensation angle is +/−5°.

9. The running gear according to claim 1, wherein the pivot axis and the axis of rotation lie in a common plane which, in a state of use, runs parallel to a road surface plane.

10. The running gear according to claim 1, wherein the guide ring has a cylindrical bore configured and arranged to accommodate the rotary bearing.

11. A transport device comprising:
    a plurality of running gears each of the plurality of running gears including
    a guide ring,
    a wheel carrier configured and arranged to be pivoted within the guide ring about a substantially vertical main axis of rotation,
    two wheels coupled to the wheel carrier and configured and arranged to be rotated about a common axis of rotation, and
    an inner ring pivotably mounted in the guide ring about the main axis of rotation via a rotary bearing, and the wheel carrier is pivotably mounted about a pivot axis arranged essentially perpendicular to the main axis of rotation via at least one pivot bearing, wherein the at least one pivot bearing is mounted on the inner ring; and
    wherein the common axes of rotation, for each of the plurality of running gears, are aligned relative to one another.

12. The transport device according to claim 11, wherein the transport device is configured and arranged to travel straight ahead in a main direction of movement, wherein the directions of travel of the plurality of running gears are parallel.

13. The transport device according to claim 11, further including an energy supply and at least one energy storage device for the energy supply, wherein the energy storage device is configured and arranged to be charged by the energy supply without direct electrical contact.

14. The transport device according to claim 11, further including one or more devices configured and arranged to facilitate automated transport, reception and delivery of transport goods, transport containers or pallets.

15. The transport device according to claim 14, wherein the one or more devices includes automated handling devices, automated working devices, complex robot systems, camera systems, and other equipment configured and arranged for performing tasks in particularly hazardous or inaccessible areas, and the transport device is configured and arranged to move in response to the wheels in coordination with the movement of the one or more devices.

16. The transport device of claim 15, wherein the automated handling devices include one or more of the following: gripping, supporting, holding and clamping devices; the automated working devices include one or more of the following: riveting, screwing, welding, painting, grinding and polishing devices; the complex robot system includes one or more of the following: joint-arm robots and snake arms; and the other equipment includes one or more of the following: remotely controlled detectors, devices for salvaging and/or defusing potentially dangerous objects.

17. The transport device of claim 11, wherein the plurality of running gears includes three or more running gears.

18. A method for operating the transport device of claim 11, including the following steps:
cornering in any main direction of movement and travel speed with the transport device, and
controlling the rotational speeds of the wheels so that travel directions of the running gears are aligned to a vanishing point derived from a trajectory of a desired path of movement at a distance from a center of movement of the transport device by means of the main axes of rotation, and
controlling a curved path speed of the transport device by controlling individual rotational speeds of the wheels.

19. The method for operating a transport device according to claim 18, further including the steps of
rotating a stand about the vanishing point at a rotational speed,
aligning the running gears to the vanishing point at a distance from the center of movement of the transport device by means of the axes of rotation by controlling the rotational speeds of the wheels, and
controlling the rotational speed of the transport device by means of the individual rotational speeds of the wheels.

20. The method for operating a transport device according to claim 14, further including navigating using laser scanners for safe operation.

21. The method for operating a transport device of claim 20, wherein the laser scanners include two laser scanners and the step of navigating further includes rotating laser beams of the two laser scanners in a sweeping and overlapping fashion over circular surface portions, facilitating a 360° panoramic view in a plane of the road surface.

* * * * *